(12) United States Patent
Reddy et al.

(10) Patent No.: US 7,673,687 B2
(45) Date of Patent: Mar. 9, 2010

(54) CEMENT COMPOSITIONS COMPRISING CRYSTALLINE ORGANIC MATERIALS AND METHODS OF USING SAME

(75) Inventors: B. Raghava Reddy, Duncan, OK (US); Bryan K. Waugh, Comanche, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 4 days.

(21) Appl. No.: 11/951,191

(22) Filed: Dec. 5, 2007

(65) Prior Publication Data
US 2009/0145602 A1    Jun. 11, 2009

(51) Int. Cl.
*E21B 33/138* (2006.01)
*E21B 47/06* (2006.01)
*C09K 8/467* (2006.01)

(52) U.S. Cl. .................. 166/288; 166/250.14; 166/293; 166/300; 166/302

(58) Field of Classification Search ........................ None
See application file for complete search history.

(56) References Cited

U.S. PATENT DOCUMENTS

| | | | |
|---|---|---|---|
| 3,359,225 A | 12/1967 | Weisend | |
| 3,891,454 A | 6/1975 | Cunningham et al. | |
| 3,937,282 A | 2/1976 | Shryock et al. | |
| 4,036,301 A | 7/1977 | Powers et al. | |
| 4,176,720 A | 12/1979 | Wilson | |
| 5,346,012 A | 9/1994 | Heathman et al. | |
| 5,346,550 A | 9/1994 | Kunzi et al. | |
| 5,373,901 A | 12/1994 | Norman et al. | |
| 5,482,550 A | 1/1996 | Strait | |
| 5,588,488 A | 12/1996 | Vijn et al. | |
| 5,604,186 A | 2/1997 | Hunt et al. | |
| 5,913,364 A | 6/1999 | Sweatman | |
| 6,167,967 B1 | 1/2001 | Sweatman | |
| 6,209,646 B1 | 4/2001 | Reddy et al. | |
| 6,258,757 B1 | 7/2001 | Sweatman et al. | |
| 6,315,825 B1 | 11/2001 | Black | |
| 6,357,527 B1 | 3/2002 | Norman et al. | |
| 6,444,316 B1 | 9/2002 | Reddy et al. | |
| 6,457,524 B1 | 10/2002 | Roddy | |
| 6,527,051 B1 | 3/2003 | Reddy et al. | |
| 6,626,243 B1 | 9/2003 | Go Boncan | |
| 6,652,643 B1 | 11/2003 | Black | |
| 6,953,091 B2 | 10/2005 | Volpert | |
| 7,077,203 B1 | 7/2006 | Roddy et al. | |
| 7,144,454 B2 | 12/2006 | Shoshany et al. | |
| 7,156,174 B2 | 1/2007 | Roddy et al. | |
| 7,174,962 B1 | 2/2007 | Roddy et al. | |
| 7,204,312 B2 | 4/2007 | Roddy et al. | |
| 7,219,733 B2 | 5/2007 | Luke et al. | |
| 2006/0065399 A1 | 3/2006 | Luke et al. | |
| 2007/0093566 A1 | 4/2007 | Thompson-Colon et al. | |
| 2007/0221378 A1 | 9/2007 | Brothers et al. | |
| 2007/0221379 A1 | 9/2007 | Brothers et al. | |
| 2008/0185147 A1* | 8/2008 | Vinegar et al. ............... | 166/288 |

FOREIGN PATENT DOCUMENTS

| | | |
|---|---|---|
| EP | 1939264 A1 | 7/2008 |
| GB | 519569 | 4/1940 |

OTHER PUBLICATIONS

Halliburton Brochure, CFR-2, "Cement Friction Reducer," 1999, 2 pages, Halliburton Energy Services, Inc.
Benge. O. G., et al, "New low-cost permafrost cementing system," SPE 10757, Mar. 1982, pp. 387-392, Society of Petroleum Engineers of AIME.
Maier, L. F., et al., "Cementing materials for cold environments," Journal of Petroleum Technology, Oct. 1971, pp. 1215-1220, American Institute of Mining, Metallurgical, and Petroleum Engineers, Inc.
Morris, E. F., "Evaluation of cement systems for permafrost," SPE 2824, Society of Petroleum Engineers of AIME, Feb. 1970, 4 pages, American Institute of Mining, Metallurgical, and Petroleum Engineers, Inc.
Foreign communication from a related counterpart application—International Search Report and Written Opinion, PCT/GB2008/003785, Mar. 12, 2009, 12 pages.

* cited by examiner

*Primary Examiner*—Zakiya W. Bates
(74) *Attorney, Agent, or Firm*—Craig W. Roddy; Conley Rose, P.C.

(57) ABSTRACT

A method of servicing a wellbore comprising placing a composition comprising cement, water, and a heat sink material into a wellbore, and allowing the composition to set, wherein at least a portion of the heat sink material undergoes a phase transition by absorbing at least a portion of the heat released upon hydration of the cement. A method of completing a wellbore, comprising forming a wellbore in a subterranean formation comprising permafrost, gas hydrates, or both, preparing a cement composition comprising cement, water, and a heat sink material, placing the cement composition into an annulus formed between a casing and the wellbore, and allowing the composition to set, wherein at least a portion of the heat sink material undergoes a phase transition by absorbing at least a portion of the heat released upon hydration of the cement, thereby reducing an amount of heat transferred from the annular cement to the surrounding permafrost and/or gas hydrates.

21 Claims, 8 Drawing Sheets

CEMENT COMPOSITIONS COMPRISING CRYSTALLINE ORGANIC MATERIALS AND METHODS OF USING SAME

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This disclosure relates to servicing a wellbore. More specifically, it relates to servicing a wellbore with compositions comprising a low heat of hydration cement.

2. Background of the Invention

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed.

The completion of subterranean wellbores in fragile geographic zones such as in permafrost poses particular challenges. Permafrost is defined as soil that stays in a frozen state for more than two years. Cement compositions for use for in subterranean formations within zones of permafrost must be designed to set before freezing and have a low heat of hydration. Large amounts of heat evolved, for example during the hydration of a hydraulic cement result in temperature increases that may be sufficient to destabilize the formation.

In addition to destabilizing the formation, high heats of hydration promote the evolution of gas from gas hydrates (e.g. methane hydrate) that are present in large amounts, typically below the sea floor in regions that slope from the continents to the deep ocean basins. They also occur in Arctic regions where permafrost formations exist. Gas hydrates are a solid ice-like phase formed at low temperature and high pressure by van der Waals forces between gas and water molecules, with the "host" water molecules forming a molecular cage which confines the "guest" gas molecules through their mutual electrostatic interaction. Most low molecular weight gases ($O_2$, $N_2$, $CO_2$, $CH_4$, $H_2S$, Ar, Kr, Xe etc.) will form a hydrate under some pressure-temperature conditions. In the ocean, gas hydrates composed predominantly of methane are common constituents of the shallow marine geosphere, and they occur both in deep sedimentary structures, and as outcrops on the ocean floor. Gas hydrates are believed to form by migration of gas from depth along faults, followed by precipitation, or crystallization, on contact of the rising gas stream with cold sea water. During well construction operations, if the temperature of the formation is raised above the temperature at which the gas is released from the gas hydrates, the released gas may destabilize the wellbore or form flow channels in and around the set cement and lead to loss of effective zonal isolation.

Compositions for use in subterranean formations comprising permafrost and/or gas hydrates must provide certain properties for a given use while minimizing the impact of these compositions on the stability of the formation, and thus an ongoing need exists for such compositions.

SUMMARY OF THE PREFERRED EMBODIMENTS

Disclosed herein is a method of servicing a wellbore comprising placing a composition comprising cement, water, and a heat sink material into a wellbore, and allowing the composition to set, wherein at least a portion of the heat sink material undergoes a phase transition by absorbing at least a portion of the heat released upon hydration of the cement.

Also disclosed herein is a method of completing a wellbore, comprising forming a wellbore in a subterranean formation comprising permafrost, gas hydrates, or both, preparing a cement composition comprising cement, water, and a heat sink material, placing the cement composition into an annulus formed between a casing and the wellbore, and allowing the composition to set, wherein at least a portion of the heat sink material undergoes a phase transition by absorbing at least a portion of the heat released upon hydration of the cement, thereby reducing an amount of heat transferred from the annular cement to the surrounding permafrost and/or gas hydrates.

Further disclosed herein is a method of reducing an amount of heat of hydration transferred from a cement composition to a surrounding formation in a wellbore, comprising determining a bottom hole circulating temperature of the wellbore, selecting a heat sink material that has a melting point greater than the bottom hole circulating temperature of the wellbore and less than a maximum temperature reached during hydration of the cement composition, adding the heat sink material to the cement composition, and placing the cement composition in the wellbore, wherein the amount of heat transferred from the cement composition to the surrounding formation is reduced in comparison to an amount of heat transferred from the cement composition to the surrounding formation in the absence of the heat sink material.

Further disclosed herein is a method of cementing a wellbore comprising dry blending cement and a heat sink material, forming a pumpable cement slurry from the dry blend, and placing the cement slurry in the wellbore, wherein at least a portion of the heat sink material undergoes a phase transition by absorbing at least a portion of the heat released upon hydration of the cement.

Further disclosed herein is a wellbore servicing composition comprising a cementitious material, water, and a heat sink material, wherein the heat sink material comprises an organic crystalline material having a melting temperature equal to or greater than about 40° C. that undergoes a phase transition from solid to liquid by absorbing at least a portion of the heat released upon hydration of the cement.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the disclosure, reference will now be made to the accompanying drawings in which.

DETAILED DESCRIPTION OF THE PREFERRED EMBODIMENTS

Figure 1:
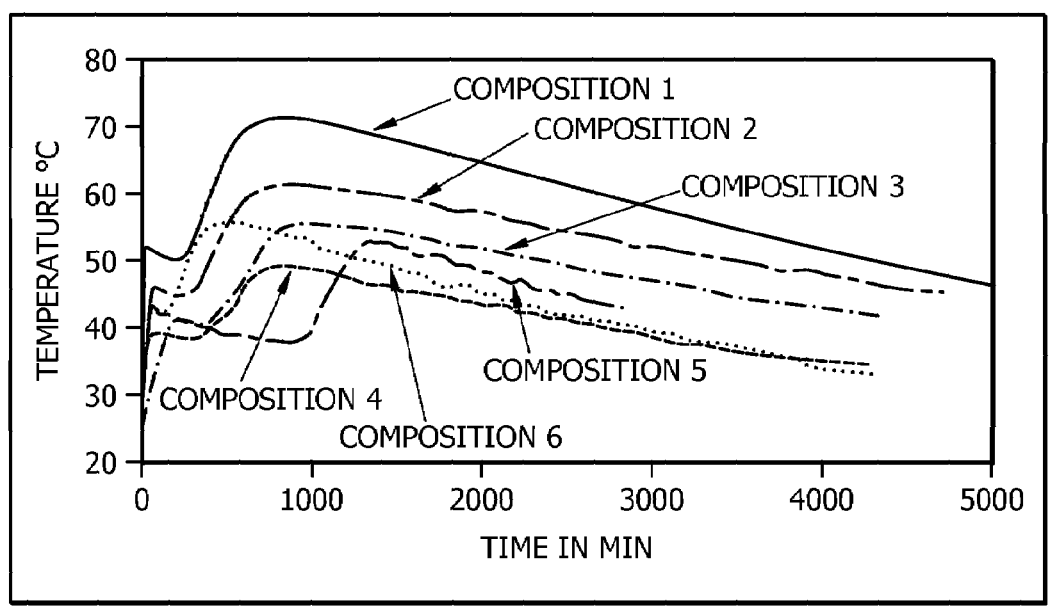
FIGS. 1 and 2 are plots of the temperature rise as a function of time for the cement compositions of Example 1.

Disclosed herein are cement compositions comprising a cementitious material, a heat sink material, and water. Further disclosed herein are methods of preparing and using such compositions. Cement compositions comprising a heat sink material may reduce the heat transferred from the composition to a subterranean formation during hydration of the cementitious material. The reduced heat transfer may be advantageous when the subterranean formation occurs within a fragile geographic region such as permafrost and/or areas containing gas hydrates. Such compositions comprising a heat sink material are hereinafter termed low heat generating cements (LHGC).

In an embodiment the LHGC comprises a cementitious material such as a hydraulic cement that sets and hardens by reaction with water. Examples of hydraulic cements include but are not limited to Portland cements (e.g., classes A, B, C, G, and H Portland cements), pozzolana cements, gypsum cements, phosphate cements, high alumina content cements, silica cements, high alkalinity cements, shale cements, acid/base cements, magnesia cements, fly ash cement, zeolite cement systems, cement kiln dust cement systems, slag cements, micro-fine cement, metakaolin, and combinations thereof. Examples of such materials are disclosed in U.S. Pat. Nos. 6,457,524; 7,077,203; and 7,174,962, each of which is incorporated herein by reference in its entirety.

In an embodiment, a LHGC comprises a heat sink material. Herein a heat sink material refers to any material compatible with the components of the LHGC and able to absorb at least a portion of the heat released during hydration of the cement, hereinafter referred to as the heat of hydration ($H_{hy}$), and reduce the maximum temperature reached by the composition during hydration, ($T_{max}$). During hydration of the cementitious material, the heat evolved may be absorbed by the heat sink material with minimal loss of heat to the surrounding formation. The $H_{hy}$ may be transmitted to the heat sink material and result in at least a portion of the heat sink material undergoing a solid to liquid phase transition; alternatively the $H_{hy}$ may be transmitted to the heat sink material and may result in about 100%, alternatively equal to or greater than about 95%, 90%, 85%, 80%, 75%, 70%, 65%, 60%, 55%, 50%, 45%, or 40% of the heat sink material undergoing a solid to liquid phase transition.

In an embodiment, the heat sink material comprises an organic crystalline material capable of undergoing a solid to liquid phase transition above about 40° C. In an embodiment, the heat sink material comprises a wax. Herein wax refers to organic materials that are solid at 20° C. (68° F.) that melt without decomposition at or above 40° C. (104° F.). The heat sink material may comprise a natural wax, a synthetic wax, or combinations thereof.

In an embodiment, the heat sink material comprises a natural wax comprising $C_{16}$-$C_{36}$ fatty acids. Examples of naturally occurring waxes include without limitation animal waxes such as beeswax, lanolin, lanocerin, shellac and ozokerite; plant waxes such as carnauba, candelila, jojoba and ouricouri; mineral waxes such as montan, semi-refined paraffin, refined paraffin, microcrystalline paraffin, intermediate paraffin and combinations thereof.

In an embodiment, the heat sink material comprises a synthetic wax. Such synthetic waxes may be further characterized by the presence of low molecular weight polymers such as for example and without limitation polypropylene; branched and linear polyethylene; polyethylene copolymers; oxidized polyethylene; polytetrafluoroethylene; fatty acid amines; polyamides and combinations thereof. Synthetic waxes may be prepared as known to one of ordinary skill in the art. For example, the synthetic wax may be prepared by the Fischer-Tropsch process; by degradation of higher molecular weight polyethylenes to obtain waxes with the desired molecular weight; or by polymerization of an alpha olefin monomer (e.g., ethylene or propylene).

In an embodiment, the heat sink material is a liquid emulsion/dispersion comprising wax dispersed in an aqueous solution. Herein an emulsion is defined as a two phase fluid containing liquid-in-liquid, and a dispersion is defined as a two phase fluid containing solid-in-liquid. Examples of such materials include without limitation the PARACOL™ and MICROLUBE™ series of wax emulsions commercially available from Hercules Inc. Such materials may be further characterized by melting points ranging from about 5° C. (41° F.) to about 40° C. (104° F.).

Alternatively, the heat sink material comprises an organic material that is liquid at surface temperatures (e.g., 5° C. (41° F.) to 20° C. (68° F.)) when it is combined with a cementitious material of the LHGC but undergoes a phase transition to a solid when placed in a subterranean formation such as a wellbore drilled in a low temperature area (e.g., permafrost). Examples of such materials include LIQUIWAXES available from Arch Chemicals, Norwalk, Conn. (USA) which may be characterized by melting points ranging from about −20° C. (−4° F.) to 5° C. (41° F.) and may include oils such as castor oil, mineral oil, linoleic acids and fatty acid esters, fatty alcohols and the like. In an embodiment such materials may be used as aqueous emulsions.

In an embodiment, the heat sink material comprises a mixture of two or more materials of the type previously described herein. The materials may be chosen so as to provide a heat sink material that is capable of absorbing the $H_{hy}$ of the cementitious material over a range of temperatures. For example, the heat sink material may comprise compounds having differing melting points such that $H_{hy}$ of the cementitious material may result in at least a portion of one component of the heat sink material undergoing a solid to liquid phase transition before a second component of the heat sink material initiates and/or completes a solid to liquid phase transition. Consequently, a heat sink material comprising a mixture of compounds of the type described previously herein may provide a broader temperature range over which the $H_{hy}$ is absorbed than a heat sink material comprising a single compound. In an alternative embodiment, the heat sink material may comprise a single chemical species of the type described herein having different crystalline forms with differing melting points. As such, this heat sink material which is a mixture of crystalline forms may exhibit a range of melt temperatures corresponding to the melt temperatures for the differing crystalline forms and thus may provide a temperature range over which the $H_{hy}$ is absorbed.

In an embodiment, the heat sink material and cementitious material may be chosen so as to allow about 50%, alternatively 75%, alternatively greater than about 95% of the heat evolved during hydration of the cementitious material to be absorbed by the heat sink material. Methods of matching of the heat of hydration profile of the cementitious material to the solid to liquid phase transition profile of the heat sink material would be known to one of ordinary skill in the art. In an embodiment, the heat sink material comprises a wax emulsion of the type previously described herein.

The heat sink material may be present in an amount effective to absorb at least a portion of the heat evolved during hydration of the cementitious material. In an embodiment, the heat sink material is present in an amount effective to absorb equal to or greater than the amount of heat released upon hydration of the cement. Such effective amounts may be determined by one of ordinary skill in the art based on a variety of factors such as the nature of the heat sink material, the nature of the cementitious material, the ratio of cementitious material to water, the temperature of the formation and the like. In an embodiment, the heat sink material is present in an amount able to absorb equal to or greater than about 50%, 55%, 60%, 65%, 70%, 75%, 80%, 85%, 90% or 95% of the heat generated during hydration of the cement. In an embodiment, the heat sink material is able to lower $\Delta T_{max}$ by equal to or greater than about 50%, alternately by equal to or greater than about 45%, 40%, 35%, 30%, 25%, 20% or 10% wherein the $\Delta T_{max}$ refers to the difference in the maximum temperature ($T_{max}$) reached during hydration of a cement slurry having a heat sink material and a cement slurry lacking a heat sink material as measured under laboratory conditions. In an embodiment, the temperature increase due to heat of hydration measured under laboratory conditions may be lowered by about 30° C. (54° F.), alternately by about 25° C. (45° F.), 20° C. (36° F.), 15° C. (27° F.), or 10° C. (18° F.) in cases where the temperature increase due to cement hydration is equal to or less than 30° C. under downhole conditions. The testing under laboratory conditions involves measurement of heat of hydration of the control slurry under adiabatic conditions at atmospheric pressure in a conventional thermos flask provided with a device capable of recording temperature as a function of time and comparing the corresponding temperature measurement for a formulation that includes the heat sink material. Simulated downhole conditions would involve measurement of temperature rise due to heat of hydration under isothermal conditions wherein the temperature is maintained at bottomhole static temperature.

In an embodiment, selection of a suitable heat sink material for a given slurry may be made based on the anticipated temperature increase under downhole conditions, wherein the cement slurry is present in an annulus enclosed by a formation. Thus, the heat sink material experiences a temperature that is between the bottom hole circulating temperatures (BHCT) which may range from about −30° C. (−22° F.) to about 32° C. (90° F.) and the bottom hole static temperatures (BHST) which may range from about −40° C. (−40° F.) to about 15° C. (59° F.). Further, the temperature experienced by the heat sink material is transmitted in some instances through a casing containing displacement fluids to the annulus. In an embodiment, the selected heat sink material will have a melting temperature that is higher than the BHCT.

The LHGC may include a sufficient amount of water to form a pumpable slurry. The water may be fresh water or salt water, e.g., an unsaturated aqueous salt solution or a saturated aqueous salt solution such as brine or seawater. The water may be present in the amount from about 20 to about 180 percent by weight of cement, alternatively from about 28 to about 60 percent by weight of cement, alternatively from about 36 to about 66 percent by weight of cement. The cement may have a density of from about 7 to about 20, alternatively from about 10 to about 18, alternatively from about 13 to about 16 pounds per gallon.

The cement slurries may additionally contain hydraulic materials which set with liberation of less heat when compared to Portland cements. Examples of such materials include calcium sulfate hydrates. Alternately, such cement composition may contain fillers which are non-cementitious but allow for lower heat generation by reducing the amount of cement present in the composition. Alternatively, the cement compositions may contain hydraulic materials which do not comprise Portland cements. Examples of such hydraulic cements include for example and without limitation, pozzolana cements, gypsum cements, calcium aluminate cements, phosphate cements, high alumina content cements, silica cements, high alkalinity cements, shale cements, acid/base cements, magnesia cements, fly ash cement, zeolite cement systems, cement kiln dust cement systems, slag cements, micro-fine cement, metakaolin, and combinations thereof. In an embodiment, the cement slurry compositions are foamed. Methods and materials for foaming a cement composition of the type disclosed herein (i.e., LHGC) are known to one of ordinary skill in the art.

In some embodiments, additives may be included in the LHGC for improving or changing the properties thereof. Examples of such additives include but are not limited to salts, accelerants, set retarders or inhibitors, defoamers, fluid loss agents, weighting materials, dispersants, vitrified shale, formation conditioning agents, or combinations thereof. Other mechanical property modifying additives, for example, carbon fibers, glass fibers, metal fibers, minerals fibers, and the like can be added to further modify the mechanical properties. These additives may be included singularly or in combination. Methods for introducing these additives and their effective amounts are known to one of ordinary skill in the art.

In an embodiment, the LHGC may be prepared by combining the cementitious material, the heat sink material, water, and optionally one or more additives. The components of the LHGC may be combined using any mixing device compatible with the composition, for example a bulk mixer. In an embodiment, the components of the LHGC are combined at the site of the wellbore. Alternatively, the components of the LHGC are combined off-site and then later used at the site of the wellbore. In an embodiment, the heat sink material is dry blended with the dry cement at a location remote from the well site, subsequently transported to the well site and formed into a pumpable slurry, and placed down a wellbore. Alternatively, the heat sink materials are added as aqueous emulsions/dispersions to the mix water which is later contacted with the cementitious material. Alternatively, the heat sink materials are aqueous emulsions/dispersion which may be injected into the slurry during the cementing operation.

In an embodiment, the heat sink material is a liquid at the temperature at which the components of the LHGC are combined (e.g., 5° C. (41° F.) to 20° C. (68° F.)). At least a portion of the heat sink material present in the LHGC when placed in a wellbore penetrating a subterranean formation in a low temperature geographic zone (e.g. permafrost) may undergo a liquid to solid phase transition and remain a solid until exposed to the heat evolved upon hydration of the cementitious material. Absorption of the $H_{hy}$ may cause at least a portion of the heat sink material to undergo a solid to liquid phase transition. The absorption of the heat of hydration of the cement and the associated conversion of the heat sink material from a solid to a liquid may reduce the amount of heat transferred from the cement composition to the surrounding formation in comparison to the amount of heat transferred from the cement composition to the surrounding formation in the absence of the heat sink material.

In an embodiment, the heat sink material is a solid at the temperature at which the components of the LHGC are combined (e.g., 5° C. (41° F.) to 20° C. (68° F.)) and remains a solid as the LHGC is placed in the wellbore. At least a portion of the heat sink material may undergo a solid to liquid phase transition upon absorption of the heat evolved upon hydration of the cementitious material.

In some embodiments, the heat sink material after exposure to the heat of hydration of the cementitious material and having been converted from a solid to a liquid may continue to be exposed to temperatures above the melting point of the material and thus at least a portion of the material may remain in the liquid state for some period of time. The duration of time at least a portion the heat sink material remains in the liquid state may vary depending on a variety of factors including the nature of the heat sink material, the temperature and pressure of the formation, and the like. Some of these factors may be adjusted by one of ordinary skill in the art to affect the length of time the heat sink material remains in the liquid state. For example, the heat sink material may be chosen to have a melting temperature that is below the ambient temperature of the formation such that the heat sink material undergoes a solid to liquid transition upon exposure to the formation and remains liquid in the formation. Alternatively, the heat sink material may be chosen to have a range of melting points so that some portion of the material is liquid under surface conditions. Exposure to the heat of hydration of the cementitious material may result in some additional portion of the heat sink material undergoing a solid to liquid phase transition. Eventually, however the heat sink material equilibrates at the ambient temperature of the formation which may be below the melting point of at least a portion of the material (e.g., permafrost) and all or a portion of the heat sink material will undergo a liquid to solid phase transition. The presence of the heat sink material in the liquid state in the LHGC may confer beneficial mechanical and/or flexural properties to the composition as will be described in more detail later herein.

In an embodiment, an LHGC of the type described herein may maintain a user-desired compressive strength at a reduced temperature when compared to an otherwise similar composition lacking a heat sink material. For example, a typical cement composition prepared and set at 150° F. may have a compressive strength X. However, at a lower temperature (e.g., 75° F.) the same composition may have a compressive strength Y where X is greater than Y. The LHGCs of this disclosure may have a compressive strength Y1 that is similar to or less than the compressive strength obtained at the same temperature without the heat sink material (i.e. Y≧Y1). In an embodiment, the LHGC sets to form a composition with a compressive strength about equal to, alternatively a compressive strength that differs by about ±20%±15%, ±10% or ±5% from an otherwise similar composition lacking a heat sink material at equivalent temperatures The LHGCs as disclosed herein may be used as wellbore servicing fluids. As used herein, a "servicing fluid" refers to a fluid used to drill, complete, work over, fracture, repair, or in any way prepare a wellbore for the recovery of materials residing in a subterranean formation penetrated by the wellbore. Examples of servicing fluids include, but are not limited to, cement slurries, drilling fluids or muds, spacer fluids, fracturing fluids or completion fluids, all of which are well known in the art. In an embodiment, the servicing fluid is for use in a wellbore that penetrates a subterranean formation comprising permafrost and/or gas hydrates. It is to be understood that "subterranean formation" encompasses both areas below exposed earth and areas below earth covered by water such as ocean or fresh water.

In an embodiment, the LHGC may be introduced to a fragile geographic zone comprising permafrost and/or gas hydrates. The heat sink material may function to increase the resistance of the LHGC to temperature fluctuations that occur during freeze/thaw cycles in such zones. For example, the heat sink material may absorb heat generated during a thaw cycle and release heat by crystallizing during a freeze cycle. Accordingly, the heat sink material may undergo solid/liquid transitions that correspond to the freeze/thaw cycles. Thus, the LHGC would serve as a buffer reducing the exposure of the cement composition and surrounding formation to temperature fluctuations. In an embodiment, the LHGC may be foamed to improve the heat/thaw cycle resistance.

In an embodiment, the LHGC may be used to form a conduit into a subterranean formation for the extraction of gas hydrates. As gas hydrates are thermally unstable materials, the LHGC may allow for the construction of a conduit with minimal heat exchange between the conduit and the formation. For example, the LHGC may be used in primary cementing of a casing string in a wellbore penetrating a formation comprising permafrost and/or gas hydrates.

The LHGC may be introduced to the wellbore to prevent the loss of aqueous or non-aqueous drilling fluids into loss-circulation zones such as voids, vugular zones, and natural or induced fractures while drilling. In an embodiment, the LHGC is placed into a wellbore as a single stream and activated by downhole conditions to form a barrier that substantially seals loss circulation zones. In such an embodiment, the LHGC may be placed downhole through the drill bit forming a composition that substantially eliminates the lost circulation. Methods for introducing compositions into a wellbore to seal subterranean zones are described in U.S. Pat. Nos. 5,913, 364; 6,167,967; and 6,258,757, each of which is incorporated by reference herein in its entirety.

The LHGC may form a non-flowing, intact mass with good strength and capable of withstanding the hydrostatic pressure inside the loss-circulation zone. Said LHGC may plug the zone and inhibit the loss of subsequently pumped drilling fluid thus allowing for further drilling. It is to be understood that, it may be desired to hasten the viscosification reaction for swift plugging of the voids. Alternatively, it may be desired to prolong or delay the viscosification for deeper penetration into the voids. For example the LHGC may form a mass that plugs the zone at elevated temperatures, such as those found at higher depths within a wellbore.

In an embodiment, the LHGC may be employed in well completion operations such as primary and secondary cementing operations. The LHGC may be placed into an annulus of the wellbore and allowed to set such that it isolates the subterranean formation from a different portion of the wellbore. The LHGC thus forms a barrier that prevents fluids in that subterranean formation from migrating into other subterranean formations. Within the annulus, the LHGC also serves to support a conduit, e.g., casing, in the wellbore. In an embodiment, the wellbore in which the LHGC is positioned belongs to a multilateral wellbore configuration. It is to be understood that a multilateral wellbore configuration includes at least two principal wellbores connected by one or more ancillary wellbores.

In secondary cementing, often referred to as squeeze cementing, the LHGC may be strategically positioned in the wellbore to plug a void or crack in the conduit, to plug a void or crack in the hardened sealant (e.g., cement sheath) residing in the annulus, to plug a relatively small opening known as a microannulus between the hardened sealant and the conduit, cement. The amount of water added was adjusted to maintain the same density in pounds per gallon (ppg) for all slurries. Measurements of the temperature rise due to hydration were performed under adiabatic conditions (in a thermally insulated flask). Then to the same formulation different amounts of wax, as indicated in Table 1, were added in amounts that delivered the same amount of wax by weight of cement. The temperature rise was measured and the results are shown in Table 1.

TABLE 1

| Component | Composition # | | | | | | |
|---|---|---|---|---|---|---|---|
| | #1 | #2 | #3 | #4 | #5 | #6 | #7 |
| Class G cement (% bwoc) | 39 | 39 | 39 | 39 | 39 | 39 | 39 |
| Calcium sulfate•½$H_2O$ (% bwoc) | 61 | 61 | 61 | 61 | 61 | 61 | 61 |
| Sodium Chloride (% wt. of water) | 3.5 | 3.5 | 3.5 | 3.5 | 3.5 | 3.5 | 3.5 |
| CFR-2 (% bwoc) | 0.53 | 0.53 | 0.53 | 0.53 | 0.53 | 0.53 | 0.53 |
| Wax Emulsion Product | None | PARACOL ™ 700N | PARACOL ™ 2370LT | PARACOL ™ 802N | PARACOL ™ 1324G | MICROLUBE ™ 700N | MICROLUBE N ™ 700N |
| Water (% bwoc) | 40 | 37 | 38 | 38 | 37 | 38 | 35 |
| Density (ppg) | 15.63 | 15.63 | 15.63 | 15.63 | 15.63 | 15.63 | 15.63 |
| Maximum temperature from hydration (° C.) | 71.5 | 61.6 | 55.9 | 49.5 | 53.8 | 56.0 | 57.8 |
| Time to reach maximum temp, (hrs:min) | 8:50 | 8:45 | 12:30 | 7:00 | 24:30 | 8:15 | 9:15 | and so forth. Various procedures that may be followed to use a sealant composition in a wellbore are described in U.S. Pat. Nos. 5,346,012 and 5,588,488, which are incorporated by reference herein in their entirety.

EXAMPLES

The invention having been generally described, the following examples are given as particular embodiments of the invention and to demonstrate the practice and advantages thereof. It is understood that the examples are given by way of illustration and are not intended to limit the specification.

Example 1

Figure 2:
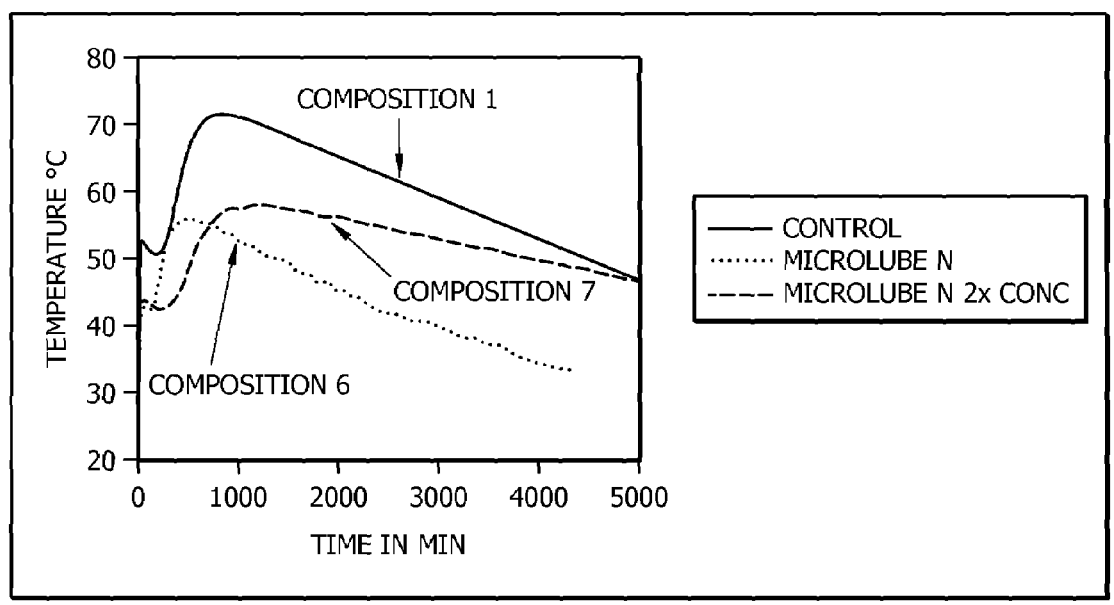
Figure 3:
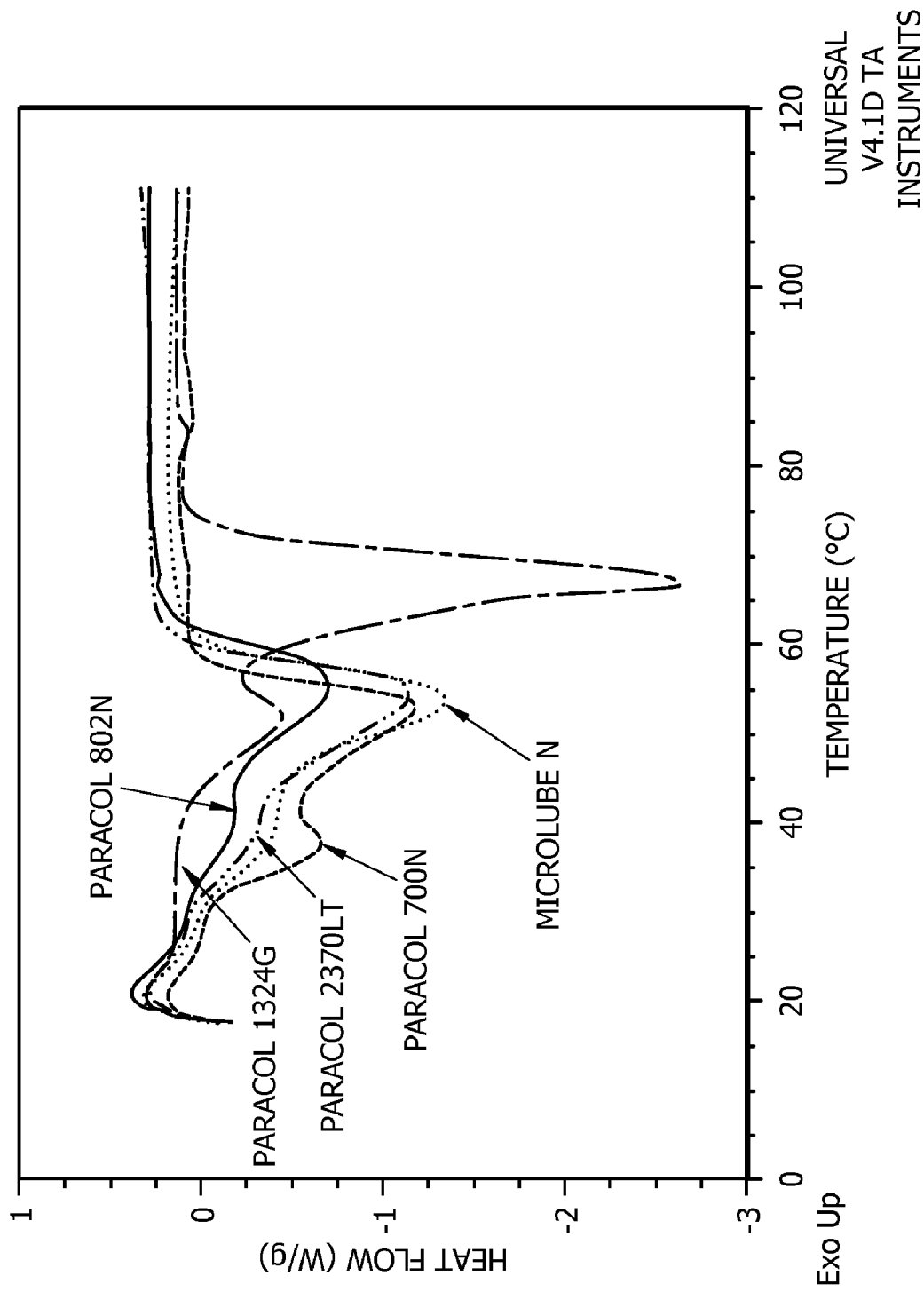
FIG. 3 is a plot of heat flow as a function of temperature for different wax formulations.

The ability of a heat sink material to absorb the heat of hydration of a cement was investigated. The cement compositions contained class G cement, calcium sulfate hemihydrate, sodium chloride, CFR-2, a wax emulsion product and water in the amounts indicated in Table 1. CFR-2 is a cement dispersant, which is a dispersing agent commercially available from Halliburton Energy Services. PARACOL™ and MICROLUBE™ are wax emulsions commercially available from Hercules, Inc. The cement compositions used are typical cementing formulations used for cementing permafrost zones and the base formulation is given as composition #1. The amount of solid wax added for each wax emulsion product is 0.96 percent by weight of cement (% bwoc) with the exception of composition #7 which contained twice that amount. The wax emulsions tested had different wax contents and the amount of emulsion added to the composition was adjusted to provide the same amount of wax by weight of As the results indicate, the maximum temperature reached due to hydration by the cement slurry can be reduced by about 22° C. by using a properly selected wax additive. The results also indicate some wax compositions may effect the time to hydration which can be adjusted by addition of suitable set accelerators or retarders as necessary to the compositions. In order to study the effect of different amounts of a wax emulsion, the wax content of the composition was doubled, composition #7, while keeping the density the same. The decrease in hydration temperature relative to the base composition, composition #1, did not change and was similar to the hydration temperature for the lower concentration of the same material, composition #6. However, the higher concentration of wax was able to retain the heat for a longer time period and extended the duration of cement hydration. The extended hydration of composition #7 is shown in FIG. 2 which is a plot of the composition temperature as a function of time for the base composition, composition #1, the composition containing MICROLUBE N, composition #6, and a composition containing twice the amount of MICROOLUBE N, composition #7. Selection of a suitable wax for a given slurry will be based on the anticipated temperature increase under downhole environment wherein the cement slurry is present in an annulus enclosed by a formation at temperatures between bottom hole circulating temperatures (BHCT) and bottom hole static temperatures (BHST). Additionally, the temperature experienced by the wax may be further modulated by the presence of casing containing displacement fluids. It is expected that the selected wax will have a melting temperature that is higher than the BHCT. Mixtures of waxes with different melting points were also contemplated. Melting points of different waxes obtained from the wax emulsion study are provided in FIG. 3 which shows the waxes may contain materials with one or more melting temperature occurring over a broad temperature range. By mixing different waxes, compositions can be designed to absorb heat in a desired temperature range.

Example 2

Figure 4:
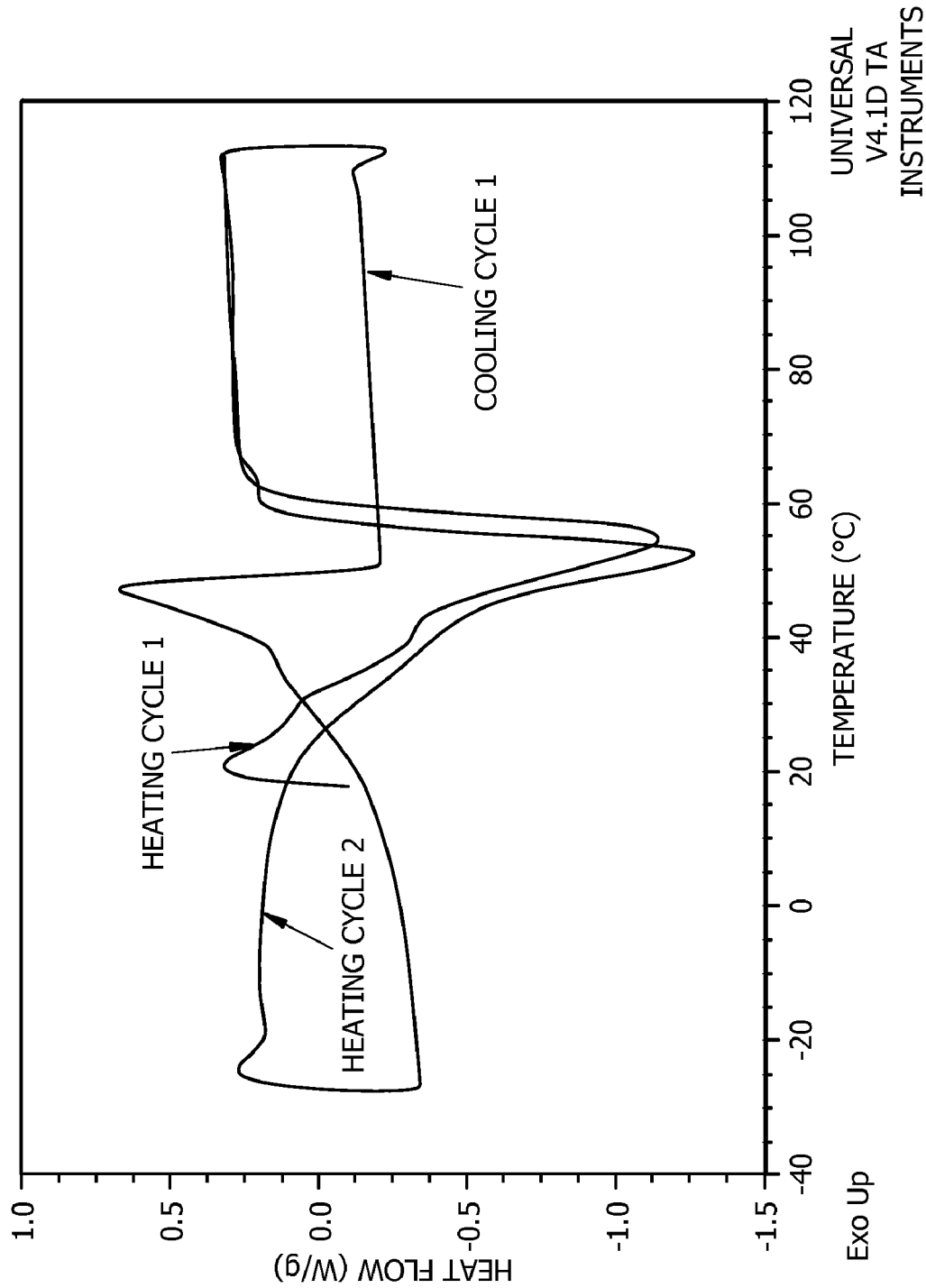
FIG. 4 is a plot of heat flow as a function of temperature for a wax.

The reversibility of the phase changes for the heat sink materials was investigated. The reversibility of phase changes with the absorption and release of heat was investigated by first melting a heat sink material, specifically PARACOL 2370LT wax emulsion. The heat sink material was then crystallized by cooling the composition and remelted by a second cycle of heating. The reversibility of these phase changes are demonstrated in FIG. 4 which is a plot of the heat flow as a function of temperature for PARACOL 2370LT. The same behavior was observed for all the waxes described in Example 1. These results indicate that the heat sink materials can be used to improve the freeze/thaw resistance of the cement composition thus extending the ability of cement composition to provide effective zonal isolation.

Example 3

Figure 5:
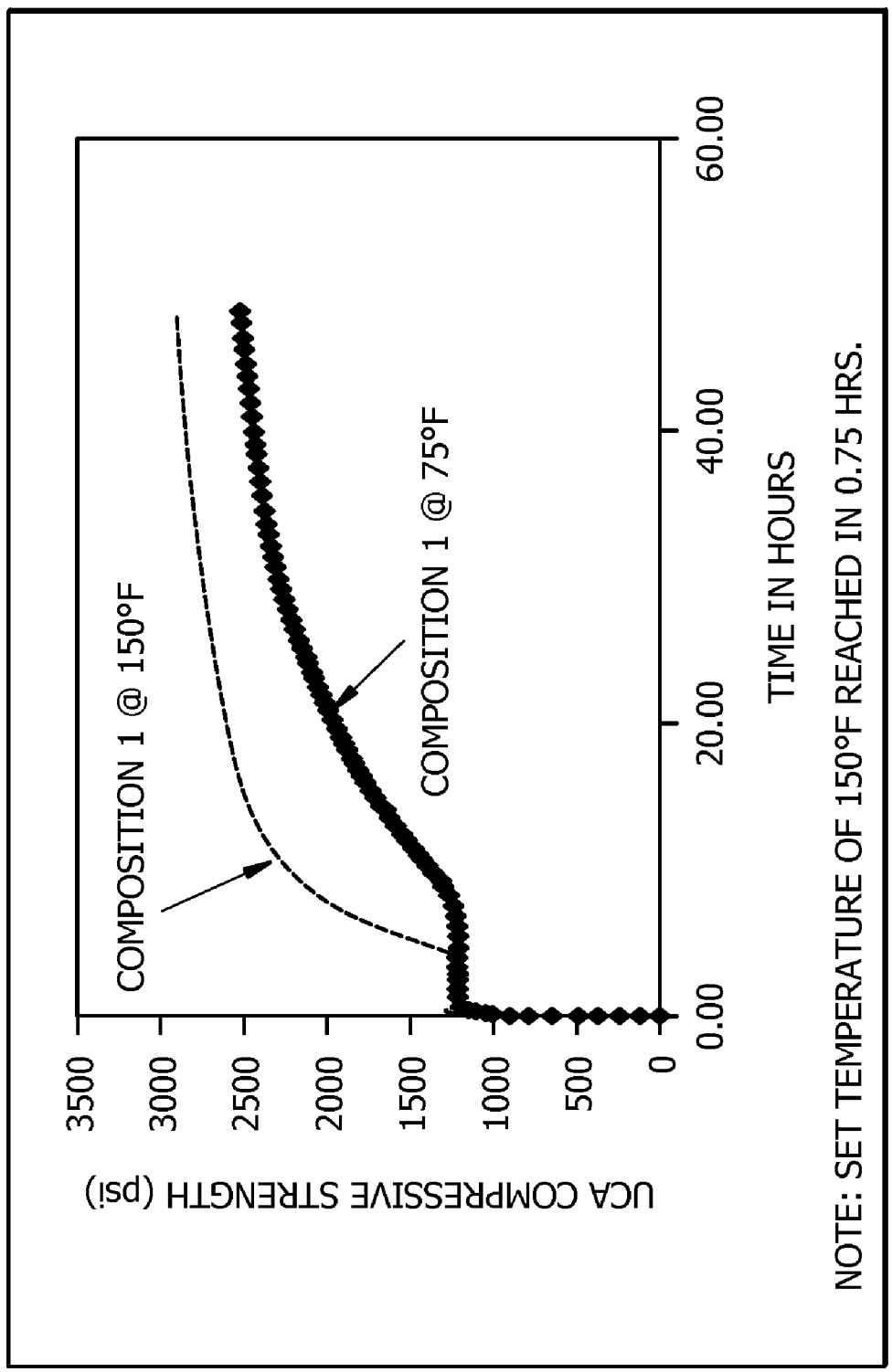
FIGS. 5 to 8 are plots of compressive strength as a function of time for the samples from Example 3.
Figure 6:
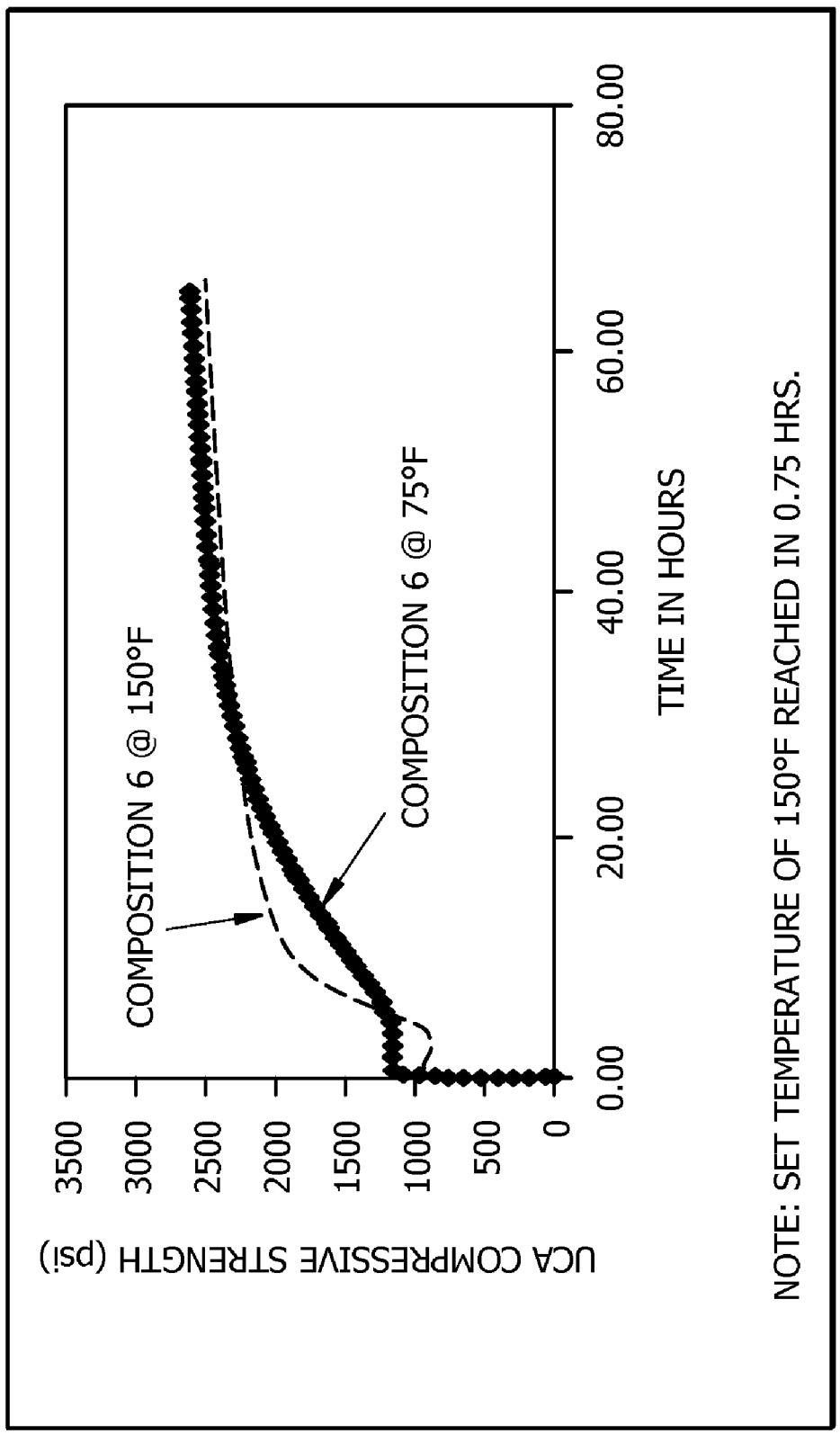
Figure 7:
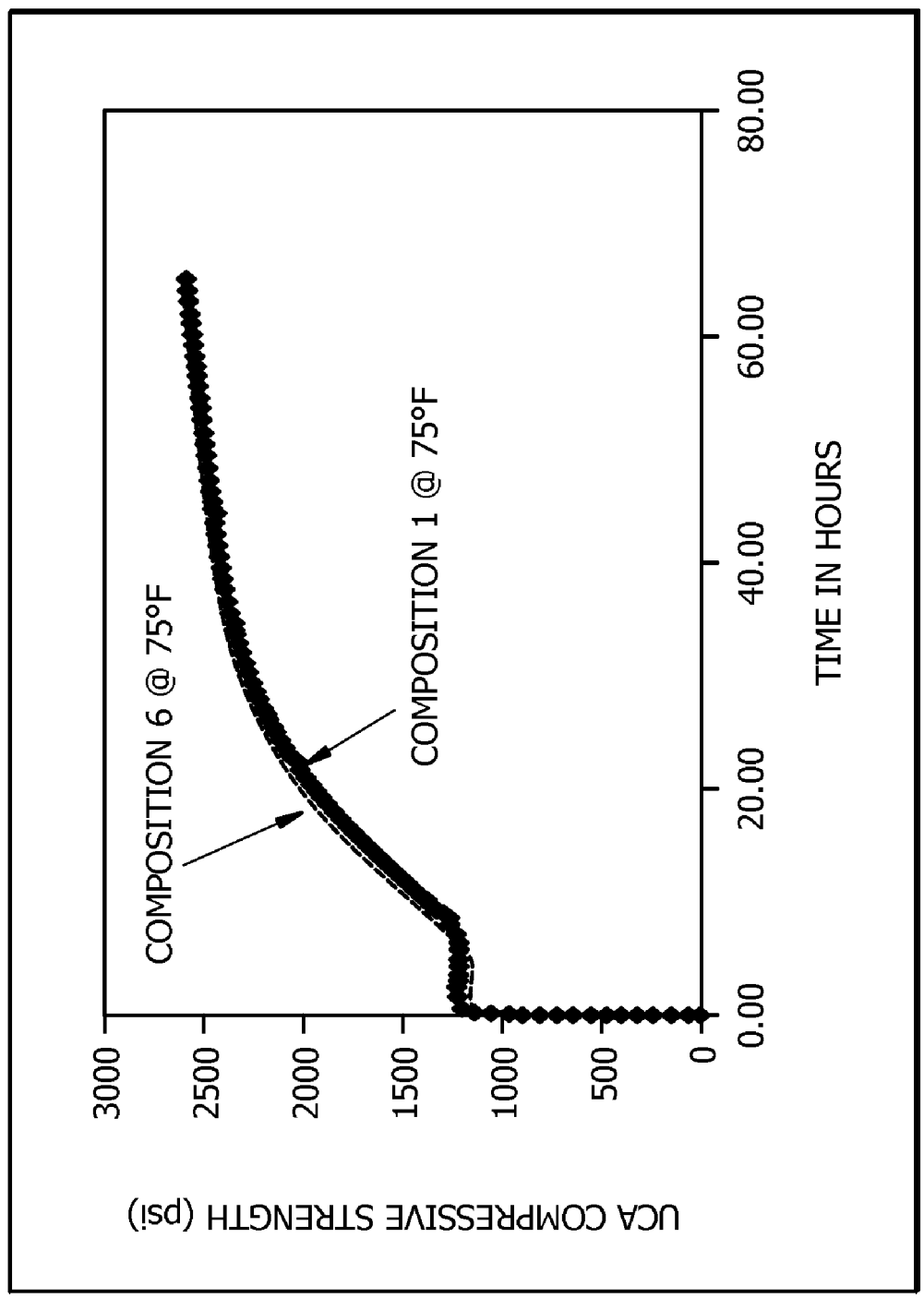
Figure 8:
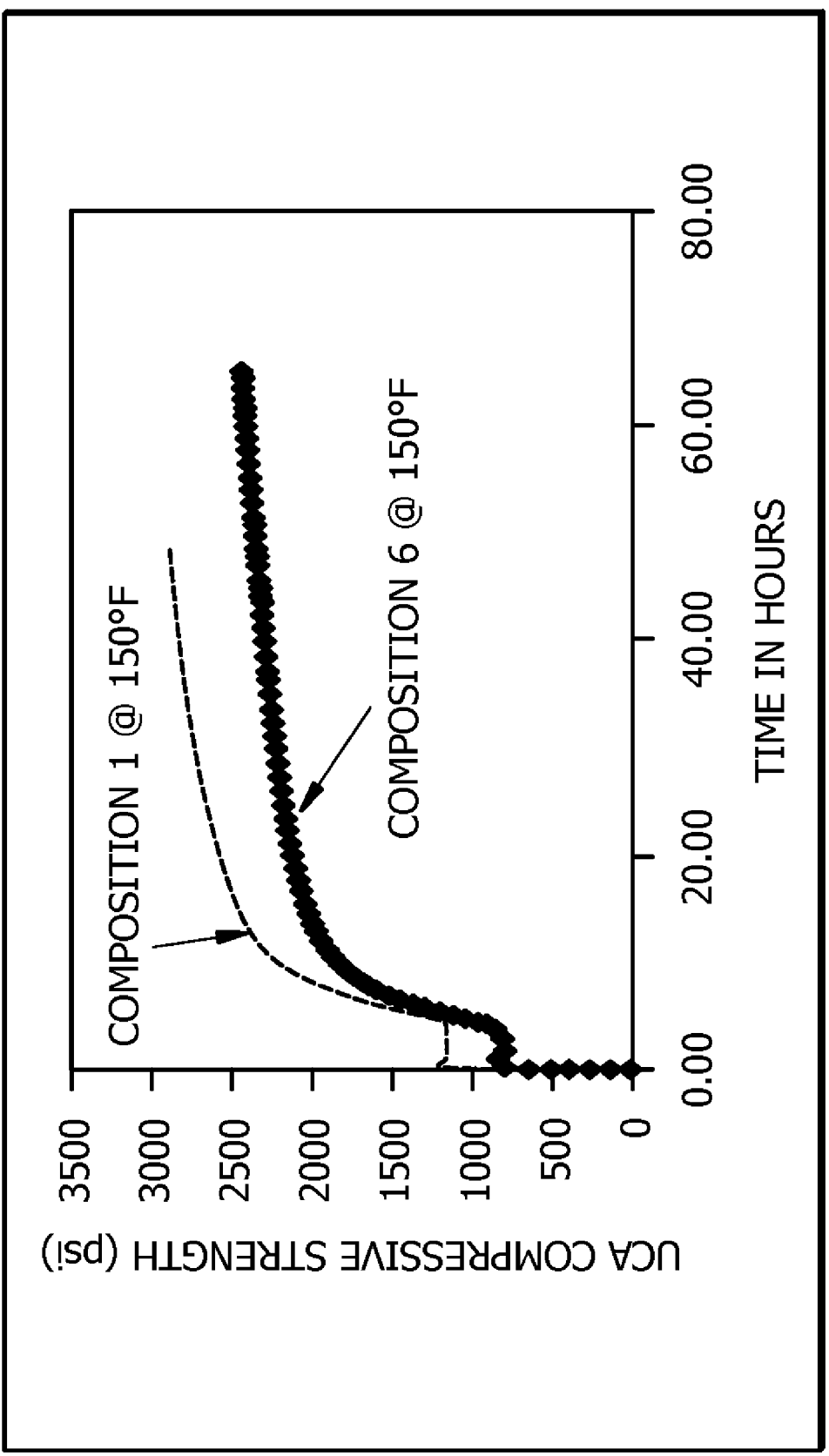

The effect of the heat sink materials on the compressive strength of the LHGC was investigated. Specifically, the compressive strength of the base slurry, composition #1, was compared to the compressive strength of a slurry containing a heat sink material, composition #6. The compressive strength, measured using an ultrasonic cement analyzer (UCA), for each composition at either 75° F. or 150° F. as indicated, were compared and are shown as plots of compressive strength as a function of time, see FIGS. 5 to 8. The results demonstrate that the base composition, composition #1, has a reduced compressive strength at 75° F. when compared to the compressive strength at 150° F., see FIG. 5. In contrast, composition #6 comprising a heat sink material, has a similar compressive strength at both 150° F. and 75° F., see FIG. 6. Further the compressive strength of compositions #1 and #6 at 75° F. are comparable, see FIG. 7; however, as expected, at 150° F. the composition comprising a heat sink material has a lower compressive strength than the base composition lacking a heat sink material, see FIG. 8. Thus the LHGC maintained its compressive strength at a reduced temperature when compared to an otherwise similar composition lacking a heat sink material.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore comprising:
   determining a bottom hole circulating temperature for the wellbore;
   selecting a heat sink material having a melting temperature higher than the bottom hole circulating temperature;
   placing a composition comprising cement, water, and the heat sink material into an annulus formed between a casing and the wellbore, wherein the heat sink material is present in an amount effective to absorb equal to or greater than the amount of heat released upon hydration of the cement; and
   allowing the composition to set, wherein at least a portion of the heat sink material undergoes a phase transition by absorbing equal to or greater than the amount of heat released upon hydration of the cement.

2. The method of claim 1 wherein the heat sink material comprises an organic crystalline material having a melting temperature equal to or greater than about 40° C.

3. The method of claim 1 wherein the heat sink material comprises a natural wax, a synthetic wax, or combinations thereof.

4. The method of claim 3 wherein the natural wax comprises $C_{16}$-$C_{36}$ fatty acids.

5. The method of claim 3 wherein the natural wax comprises beeswax, lanolin, lanocerin, shellac, ozokerite, camauba, candelila, jojoba, ouricouri, montan, semi-refined paraffin, refined paraffin, microcrystalline paraffin, intermediate paraffin, or combinations thereof.

6. The method of claim 3 wherein the synthetic wax comprises low molecular weight polymers.

7. The method of claim 6 wherein the low molecular weight polymers comprise polypropylene; branched and linear polyethylene; polyethylene copolymers; oxidized polyethylene; polytetrafluoroethylene; fatty acid amines; polyamides or combinations thereof.

8. The method of claim 1 wherein the heat sink material comprises an emulsion or a dispersion.

9. The method of claim 1 wherein the composition comprises two or more heat sink materials.

10. The method of claim 9 wherein at least two of the heat sink materials have different melting points.

11. The method of claim 10 wherein the at least two heat sink materials having different melting points are different crystalline forms of the same material.

12. The method of claim 1 wherein the heat sink material is a liquid at surface ambient conditions, forms a solid at down hole ambient conditions, and forms a liquid upon absorbing at least a portion of the heat released upon hydration of the cement.

13. The method of claim 12 wherein the heat sink material undergoes solid/liquid transformations down hole corresponding to freeze/thaw cycles of the formation.

14. The method of claim 1 wherein the heat sink material is able to lower the maximum temperature due to hydration of the slurry by greater than or equal to about 10%.

15. The method of claim 1 wherein the composition has a compressive strength that varies by about ±5% from an otherwise similar composition lacking a heat sink material at equivalent temperatures.

16. The method of claim 1 wherein the wellbore penetrates a subterranean formation comprising permafrost and/or gas hydrates.

17. The method of claim 1 wherein the heat sink material lowers a $\Delta T_{max}$ by equal to or greater than about 10%.

18. A method of completing a wellbore, comprising:
   forming a wellbore in a subterranean formation comprising permafrost, gas hydrates, or both;
   determining a bottom hole circulating temperature for the wellbore;
   selecting a heat sink material having a melting temperature higher than the bottom hole circulating temperature;
   preparing a cement composition comprising cement, water, and the heat sink material wherein the heat sink material is present in an amount effective to absorb equal to or greater than the amount of heat released upon hydration of the cement;
   placing the cement composition into an annulus formed between a casing and the wellbore; and
   allowing the composition to set, wherein at least a portion of the heat sink material undergoes a phase transition by absorbing equal to or greater than the amount of heat released upon hydration of the cement, thereby reducing an amount of heat transferred from the annular cement to the surrounding permafrost and/or gas hydrates.

19. The method of claim 18 wherein the heat sink material comprises a natural wax, a synthetic wax, or combinations thereof.

20. A method of reducing an amount of heat of hydration transferred from a cement composition to a surrounding formation in a wellbore, comprising:
   determining a bottom hole circulating temperature of the wellbore;
   selecting a heat sink material that has a melting point greater than the bottom hole circulating temperature of the wellbore and less than a maximum temperature reached during hydration of the cement composition;
   adding the heat sink material to the cement composition; and
   placing the cement composition in the wellbore, wherein the amount of heat transferred from the cement composition to the surrounding formation is reduced in comparison to an amount of heat transferred from the cement composition to the surrounding formation in the absence of the heat sink material and wherein the heat sink material is present in an amount effective to absorb equal to or greater than the amount of heat released upon hydration of the cement.

21. A method of cementing a wellbore comprising
   dry blending cement and a heat sink material wherein the heat sink material is present in an amount effective to absorb equal to or greater than the amount of heat released upon hydration of the cement;
   forming a pumpable cement slurry from the dry blend; and
   placing the cement slurry in the wellbore, wherein at least a portion of the heat sink materials undergo a phase transition by absorbing equal to or greater than the amount of heat released upon hydration of the cement.

* * * * *